May 26, 1964 A. A. JORGENSEN 3,134,856

INFORMATION TRANSFER CIRCUIT

Filed March 13, 1961

INVENTOR.
ADAM A. JORGENSEN
BY
Robert Nathans
ATTORNEY

United States Patent Office 3,134,856

Patented May 26, 1964

3,134,856

INFORMATION TRANSFER CIRCUIT

Adam A. Jorgensen, Victor, N.Y., assignor to General Dynamics Corporation, Rochester, N.Y., a corporation of Delaware Filed Mar. 13, 1961, Ser. No. 95,109
8 Claims. (Cl. 179—15)

Figures 1, 2:
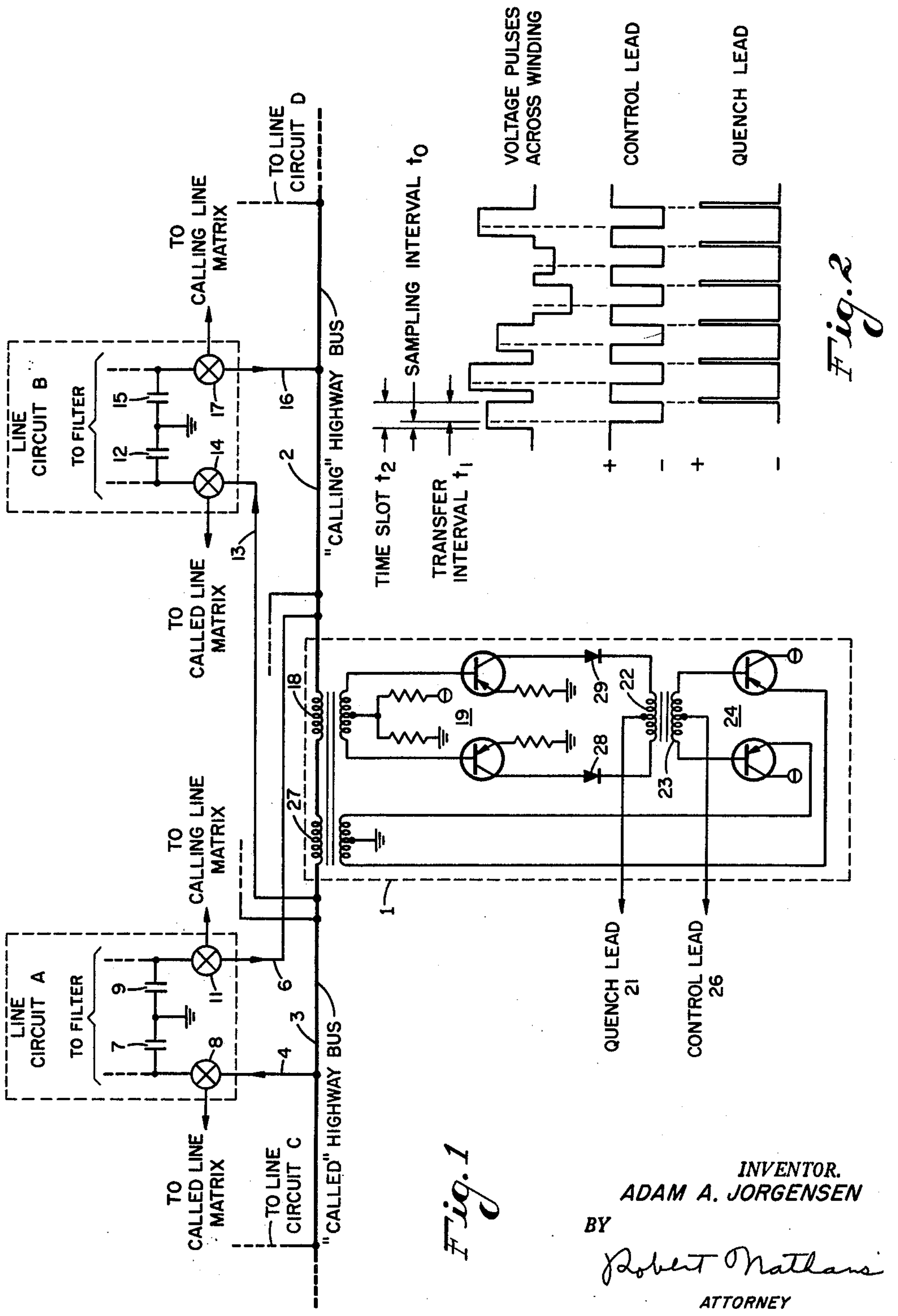

The present invention relates to information transfer circuits, particularly those utilized in time division multiplex electronic switching systems.

In time division multiplex switching systems a large number of storage devices which are associated with sources of electrical information, such as telephone subsets, are capable of being coupled to a common transmission highway or channel through a plurality of high speed line gates. A transmission path is established by causing a storage device associated with a first line circuit to be coupled to a storage device associated with a second line circuit through the common transmission highway by simultaneously enabling the line gates associated with each storage device during the same time slot in recurring transmission frames. Intelligence is transmitted by altering the electrical energy stored in the storage devices. Since these storage devices are electrically connected during the aforementioned time slot, changes in the electrical energy contained in one storage device will cause changes in the electrical energy stored within the second storage device. It has been found, however, that losses occur when these storage devices are directly connected together through the aforementioned gates and the common transmission highway or channel. Such losses may be overcome by the insertion of a bilateral amplifier in the common transmission highway to which the aforementioned storage devices are connected, where the bilateral amplifier produces a voltage having a time-integral proportional to the voltage difference between the voltages produced across the aforementioned storage devices. Since this voltage will be in series with the voltages produced across the storage devices, it follows that the bilateral amplifier will operate as an electrical pump to reduce the aforementioned transmission loss.

Accordingly, it is a principal object of the present invention to provide a new and improved system for transferring electrical energy from one storage device to another in a "lossless" manner.

It is a further object of the present invention to provide a new and improved time division multiplex switching system for transferring without apparent loss electrical energy representative of intelligence between a pair of storage devices which are simultaneously coupled to a common transmission channel during a particular interval or time slot during recurring intervals or transmission frames.

It is a feature of the present invention to provide a bilateral amplifier situated within a time division multiplex transmission highway or channel for generating a transfer voltage within each time slot, the time-integral of which is proportional to the difference in the voltages produced across the storage devices associated with individual line circuits, which storage devices are simultaneously coupled to the highway during a particular time slot thereby to facilitate the "lossless" transfer of energy between the storage devices.

Further objects, features and the attending advantages of the present invention will become apparent with reference to the following specification and drawings in which:

FIG. 1 discloses a preferred embodiment of the present invention, and

FIG. 2 discloses a pulse diagram which facilitates the comprehension of the operation of the embodiment of the invention disclosed in FIG. 1.

Referring now to FIG. 1, bilateral amplifier 1 is disclosed coupled between calling highway bus 2 and called highway bus 3 all of which make up the common transmission highway or channel. Line circuit A is disclosed having an input lead 4 coupled to bus 3 and having an output lead 6 coupled to bus 2. Input lead 4 is connected to storage device 7 through line gate 8 and lead 6 is coupled to storage device 9 through line gate 11. Storage devices 7 and 9 are in turn coupled to filters not shown, which filters may be in turn coupled to electromechanical or other transducers. In like manner, storage device 12 is coupled to bus 3 by way of incoming conductor 13 and line gate 14. Similarly, storage device 15 is coupled to bus 2 through outgoing conductor 16 and line gate 17. Storage devices 12 and 15 of line circuit B are coupled to transducers through filters (not shown) in the same manner as storage devices 7 and 9 of line circuit A. Other line circuits are coupled to highway busses 2 and 3 in a similar manner as line circuits A and B, i.e., the outgoing conductors corresponding to conductors 6 and 16 are connected to calling highway bus 2 whereas incoming conductors similar to 13 and 4 of the disclosed line circuits are connected to called highway bus 3.

Information may be transferred between line circuits A and B as follows: Let us assume that a subscriber or machine associated with line circuit A wishes to communicate with a subscriber or machine associated with line circuit B. By means of apparatus not shown but fully disclosed in patent application, Serial No. 45,342 of Barrie Brightman, filed July 26, 1960 and assigned to the same assignee as the present invention, line gate 11 is enabled simultaneously with line gate 14 during a particular assigned time slot within repetitive transmission frames. After this connection is established, storage device 9 will contain a quantity of electrical energy representative of information. This quantity could represent the instantaneous amplitude of a sampled voice wave. At this instant, storage device 12 will contain little or no electrical energy. Under these conditions, a voltage will be impressed across winding 18 proportional to the voltage across capacitor 9 or, in the event that some energy is contained within storage device 12, a voltage proportional to the difference between the volatges produced across capacitor 9 and capacitor 12. During this period which may be designated the sampling interval $t_0$ shown in FIG. 2, a push-pull transistorized amplifier 19 which is enabled by a negative potential impressed upon quench lead 21 will be unbalanced to a degree depending upon this impressed potential. This unbalancing action causes electrical energy to be stored in primary winding 22 of transformer 23, which is proportional to the mean voltage impressed across winding 18 during the sampling interval $t_0$. During this sampling interval, push-pull transistorized amplifier 24 is disenabled by the positive potential impressed upon control lead 26 and therefore the aforementioned electrical energy is built up within primary winding 22 without being dissipated. At the end of sampling interval $t_0$ and at the beginning of transfer interval $t_1$, control lead 26 goes sharply negative as shown in FIG. 2, thereby to enable push-pull amplifier 24. The degree of unbalance of amplifier 24 will be proportional to the energy stored within primary winding 22 thereby to cause the generation of a voltage across winding 27 proportional to this degree of unbalance. The voltage generated across winding 27 will further induce a voltage across the input winding of transistorized amplifier 19 thereby to produce a regenerative action due to positive feedback. The net result is that winding 27 acts as a voltage source or pump to forcibly transfer the entire charge from capacitor 9 into capacitor 12 during the transfer interval $T_1$. The greater the amount of energy to be transferred during a particular time slot the greater the mean voltage produced across winding 27 and hence the greater the pumping action of the amplifier. The filters are designed so that in the interval between the time slot assigned to line circuit A and line circuit B, capacitor 12 will be completely discharged and capacitor 9 will again be charged to an extent depending upon the information to be transmitted at this instant (e.g., the instantaneous amplitude of a voice wave). Of course, should information be transmitted from line circuit B to line circuit A, current would flow in the opposite direction which is obvious due to the symmetry of the arrangement disclosed in FIG. 1.

At the end of transfer interval $T_1$ which is also the end of the assigned time slot, a sharp positive "spike" is applied to quench lead 21 as disclosed in FIG. 2. This action causes the momentary break down of diodes 28 and 29 which in turn causes the discharge of any remaining energy contained within primary winding 22 thereby to prepare the bilateral amplifier for transferring information during the succeeding time slot which may link two other line circuits (not shown) in FIG. 1. These diodes are of a type which will not be injured by the aforementioned momentary break down. For example, a silicon junction type diode may be used.

While line gates 11 and 14 are being simultaneously enabled it should be noted that line gates 17 and 8 are disenabled. Line gates 17 and 8 will be simultaneously enabled where the subscriber or machine associated with line circuit B initiates the transmission path from line circuit B to line circuit A. Under these circumstances, line gates 11 and 14 are disenabled. The transfer process between capacitors 15 and 7 is similar to the aforementioned transfer process between capacitors 9 and 12.

If desired, the regenerative feedback feature disclosed hereinabove may be eliminated by introducing means for disabling the input end of the amplifier during the sampling period. Even without the regenerative feature the voltage-integral of the transfer voltage will still be generated across winding 27 which is proportional to the mean voltage impressed across winding 18 during the sampling interval $t_0$. This transfer voltage operates in series with the voltages produced across the storage devices to effect the transfer. The regenerative feature, however, will greatly improve the response time of bilateral amplifier 1 so that for high speed time division multiplex systems this rapid response time is of a distinct advantage since a great number of line circuits may be accommodated per common transmission highway.

In summary, a voltage is produced across the input circuit of a bilateral push-pull amplifier which input voltage is proportional to the amount of energy which is to be transferred between storage devices coupled together during a particular assigned time slot. This input voltage controls the amplifier so that an output voltage is produced between the aforementioned storage devices which acts as an electrical pump to transfer the required amount of energy from the storage device having the greater amount of electrical energy stored within it to the storage device having the lesser amount of electrical energy stored within it. The greater the amount of energy to be transferred during a particular time slot the greater the mean voltage produced across winding 27 and hence the greater the pumping action of the amplifier. Positive feedback may be utilized during the transfer interval within each time slot to reduce the response time of the amplifier.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In combination, a series circuit including a first electrical storage device, a second electrical storage device, switching means capable of coupling said first and second storage devices in series, means for enabling said switching means, means inserted in the aforementioned series circuit for developing a transfer voltage during at least a portion of the period when said switching means is enabled, the time-integral of said developed voltage being related to the difference in voltage between the voltage produced by said first storage device and the voltage produced by said second storage device, said means for developing a transfer voltage further comprising means for detecting the difference between the voltages produced by said first and second electrical storage devices, a third storage device, means coupled to the output circuit of said detection means for controlling the energy stored in said third storage device depending upon the voltage applied to said means for detecting, and means controlled by the amount of energy stored in said third storage device for developing a voltage proportional to said stored energy in series with said first and second electrical storage devices.

2. A time division multiplex switching system comprising, a highway having first and second portions distinct from one another, first and second groups of storage devices, first and second groups of gates, means for coupling each storage device in said first group of storage devices to one terminal of an associated gate in said first group of gates, means for coupling each storage device of said second group of storage devices to one terminal of an associated gate in said second group of gates, means for coupling the other terminal of each gate in said first group of gates to the first portion of said highway, means for coupling the other terminal of each gate of said second group of gates to the second portion of said highway, means for enabling a particular gate in said first group of gates and a particular gate in said second group of gates, and means coupled between said portions for developing a transfer voltage during an interval included within the time period when said particular gates are enabled, the time integral of said transfer voltage developed during said interval being related to the difference between the potentials developed by the storage devices coupled to said particular gates.

3. The combination as set forth in claim 2 wherein said means for developing a transfer voltage further comprises, means for detecting the difference between the voltages produced by the storage devices coupled to said particular gates, a control storage device, means coupled to the output circuit of said means for detecting for controlling the energy stored in said control storage device depending upon the voltage detected, and means controlled by the amount of energy stored within said control storage device for developing said transfer voltage in series with said first and second groups of gates during said interval.

4. The combination as set forth in claim 3 further including means for discharging said control storage device after the time period when said particular gates are enabled.

5. The combination as set forth in claim 1 further including means for discharging said third storage device.

6. A time division multiplex switching system comprising, first and second groups of storage devices, first and second groups of gates, means for coupling each storage device in said first group of storage devices to one terminal of an associated gate in said first group of gates, means for coupling each storage device of said second group of storage devices to one terminal of an associated gate in said second group of gates, means for coupling the other terminal of each gate of said first group of gates to a calling highway bus, means for coupling the other terminal of each gate of said second group of gates to a called highway bus, means for enabling a particular gate in said first group of gates and a particular gate in said second group of gates during a given time period, means for detecting the difference between the voltages produced by the storage devices coupled to said particular gates, a control storage device, means coupled to the output circuit of said means for detecting for controlling the energy stored in said control storage device during a first interval within said time period, and means controlled by the amount of energy stored within said control storage device for developing a transfer voltage in series with said first and second groups of gates during a second interval within said time period the time-integral of said transfer voltage being related to the difference between the potentials developed by the storage devices coupled to said particular gates.

7. The combination as set forth in claim 6 wherein means are provided between the output circuit of said means for developing said transfer voltage and the input circuit of said means for detecting, for inducing positive feedback between said two last-mentioned circuits.

8. The combination as set forth in claim 3 wherein means are provided between the output circuit of said means for developing said transfer voltage and the input circuit of said means for detecting, for inducing positive feedback between said two last-mentioned circuits.

References Cited in the file of this patent

UNITED STATES PATENTS 2,962,551 Johannesen ............ Nov. 29, 1960